United States Patent [19]
Chen

[11] Patent Number: 5,718,315
[45] Date of Patent: Feb. 17, 1998

[54] FREE-WHEEL HUB TRANSMISSION MECHANISM

[75] Inventor: Kun-Teng Chen, Taichung Hsien, Taiwan

[73] Assignee: Kun Teng Industry Co., Ltd., Hsien, Taiwan

[21] Appl. No.: 672,428

[22] Filed: Jun. 28, 1996

[51] Int. Cl.⁶ ............................................ F16D 23/00
[52] U.S. Cl. ........................ 192/64; 192/45.1; 192/94
[58] Field of Search ............................ 192/64, 94, 45.1

[56] References Cited

U.S. PATENT DOCUMENTS

| | | | |
|---|---|---|---|
| 1,278,648 | 9/1918 | Henry | 192/64 |
| 2,246,191 | 6/1941 | Schmitz | 192/64 |
| 3,010,553 | 11/1961 | Van Der Plas | 192/64 |
| 4,558,770 | 12/1985 | Woodruff | 192/94 X |
| 4,593,799 | 6/1986 | Ozaki | 192/64 X |
| 4,758,013 | 7/1988 | Agrillo | 192/94 X |
| 5,515,957 | 5/1996 | McConaghy | 192/64 |

FOREIGN PATENT DOCUMENTS

| | | | |
|---|---|---|---|
| 340087 | 6/1901 | France | 192/64 |
| 90768 | 4/1959 | Netherlands | 192/64 |
| 12531 | 6/1905 | United Kingdom | 192/64 |

*Primary Examiner*—Charles A. Marmor
*Assistant Examiner*—Saúl J. Rodríguez
*Attorney, Agent, or Firm*—Renner, Otto, Boisselle & Sklar, P.L.L.

[57] ABSTRACT

A free-wheel hub transmission mechanism includes an axle, and an aluminum hub barrel and a driving barrel which are rotatably mounted on the axle. The driving barrel which carries a sprocket wheel has a threaded body portion extending into the hub barrel to connect to a coupling socket which transmits the rotation of the driving barrel to a reinforcing hollow body. The reinforcing hollow body is provided in and fixedly coupled to the hub barrel. The coupling socket is movable toward and frictionally engageable with the reinforcing hollow body upon rotation of the driving barrel in one direction and is disengageable from the reinforcing hollow body upon rotation of the driving barrel in another direction.

2 Claims, 4 Drawing Sheets

FREE-WHEEL HUB TRANSMISSION MECHANISM

BACKGROUND OF THE INVENTION

1. Field of the Invention

This invention relates to bicycles, more particularly to a free-wheel hub transmission mechanism of a bicycle with a reinforced construction to strengthen the mechanism.

2. Description of the Related Art

The free-wheel of a bicycle is driven by a chain drive through a free-sprocket. Referring to FIG. 1, a free-wheel hub transmission mechanism comprises a threaded axle 2 to be coupled to a rear fork of a bicycle (not shown), a hub barrel 1 which is connected to the free-wheel spokes of a rear wheel and which has a longitudinal through-hole 1a to receive the axle 2, a driving barrel 4 which is sleeved onto the axle 2 and which has one end inserted into the hub barrel 1 and an opposite end fastened to a sprocket wheel of the bicycle, a coupling socket 5 which is mounted within the hub barrel 1 around the axle 2, a spring 6 which is mounted within the hub barrel 1 around the coupling socket 5, a conical bushing 7 and a cup 7a which are mounted within the hub barrel 1 to stop the spring 6 inside the hub barrel 1, two ball bearings 3,8 to rotably support the hub barrel 1, and two lock nuts 9 which are respectively threaded onto two opposite ends of the axle 2. The front inner wall of the longitudinal through-hole 1a forms a stop shoulder 1b. The driving barrel 4 has a threaded body 4a in a rear end which is engaged threadably into a threaded hole 5a of the coupling socket 5, and a head 4b which is inserted into the sprocket wheel 41 of the bicycle.

When the sprocket wheel 41 is rotated in one direction, the driving barrel 4 is synchronuously turned, causing the coupling socket 5 to move forwards the stop shoulder 1b. Thus, the hub barrel 1 is rotated by the sprocket wheel 41.

When the sprocket wheel 41 is rotated in the other direction, the driving barrel 4 is synchronuously turned causing the coupling socket 5 to move backward away from the stop shoulder 1b. Thus, the coupling socket 5 is disengaged from the hub barrel 1, causing the idle running of the sprocket wheel 41.

In order to reduce the weight of the hub barrel 1, it has been known to make the hub barrel 1 with an aluminum alloy. However, this creates a problem in that the strength of the hub barrel 1 is not enough to resist wear caused by the frictional engagement between the hub barrel 1 and the coupling socket 5. Moreover, the frictional engagement of the coupling socket 5 and the hub barrel 1 is insufficient for effective transmission.

SUMMARY OF THE INVENTION

Therefore, the objective of the present invention is to provide a free-wheel hub transmission mechanism with a reinforcement construction to reduce wear caused to the hub barrel as well as to improve interengagement of the hub barrel with the coupling socket.

According to this invention, the free-wheel hub transmission mechanism comprising an axle, an aluminum hub barrel which is rotatably mounted on the axle and which has a longitudinal through-hole around the axle, a driving barrel which is rotatably mounted on the axle for driving the hub barrel and which has a threaded body portion extending into the through-hole of the hub barrel, and a head portion extending outwardly of the hub barrel, a sprocket wheel which is mounted to the head portion, a reinforcing hollow body which is provided in the through-hole around the axle and which is coupled to the hub barrel for simultaneous rotation therewith, a coupling socket which is provided in the through-hole around the axle, the coupling socket having a portion which extends into the reinforcing hollow body around the threaded body portion and which engages threadedly the threaded body portion, and a spring which is mounted in the through-hole around the axle to bias the coupling socket against the reinforcing hollow body. The coupling socket is movable toward and frictionally engageable with the reinforcing hollow body upon rotation of the driving barrel in one direction. The coupling socket is disengageable from the reinforcing hollow body upon rotation of the driving barrel in another direction.

BRIEF DESCRIPTION OF THIS DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
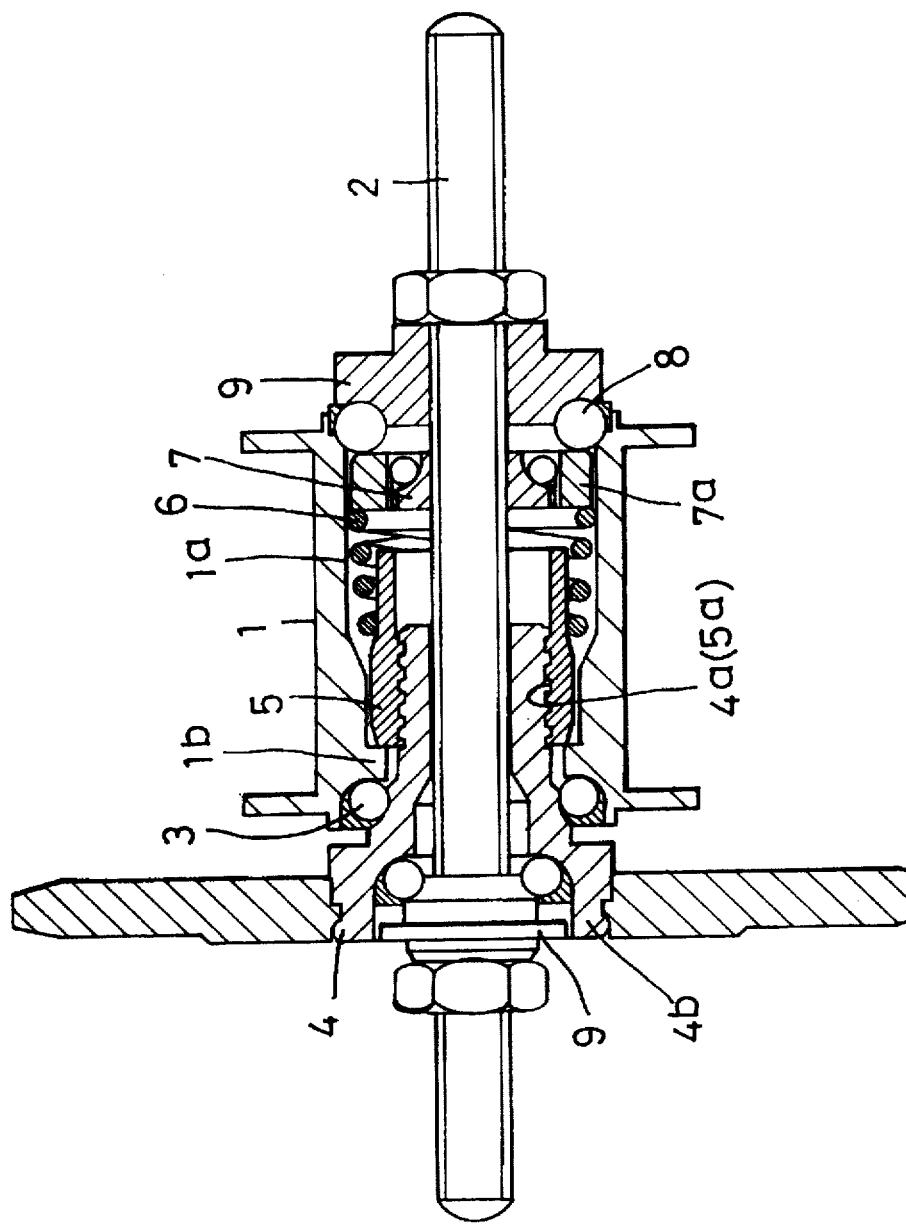
FIG. 1 is a sectional view of a conventional free-wheel hub transmission mechanism.
Figure 2:
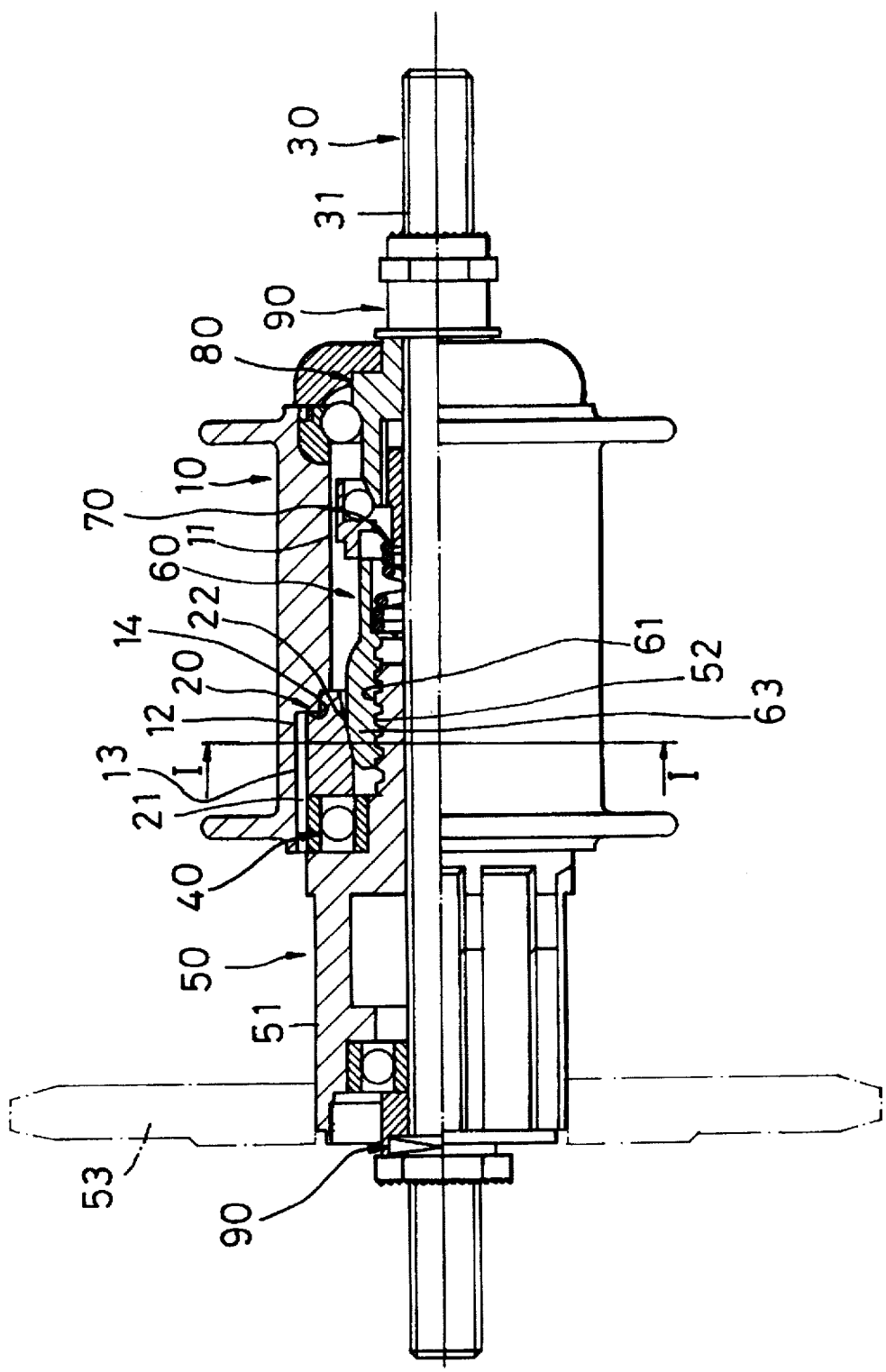
FIG. 2 is a partial sectional view of the free-wheel hub transmission mechanism according to this invention, in which the coupling socket is forced into engagement with the reinforcing hollow body.
Figure 3:
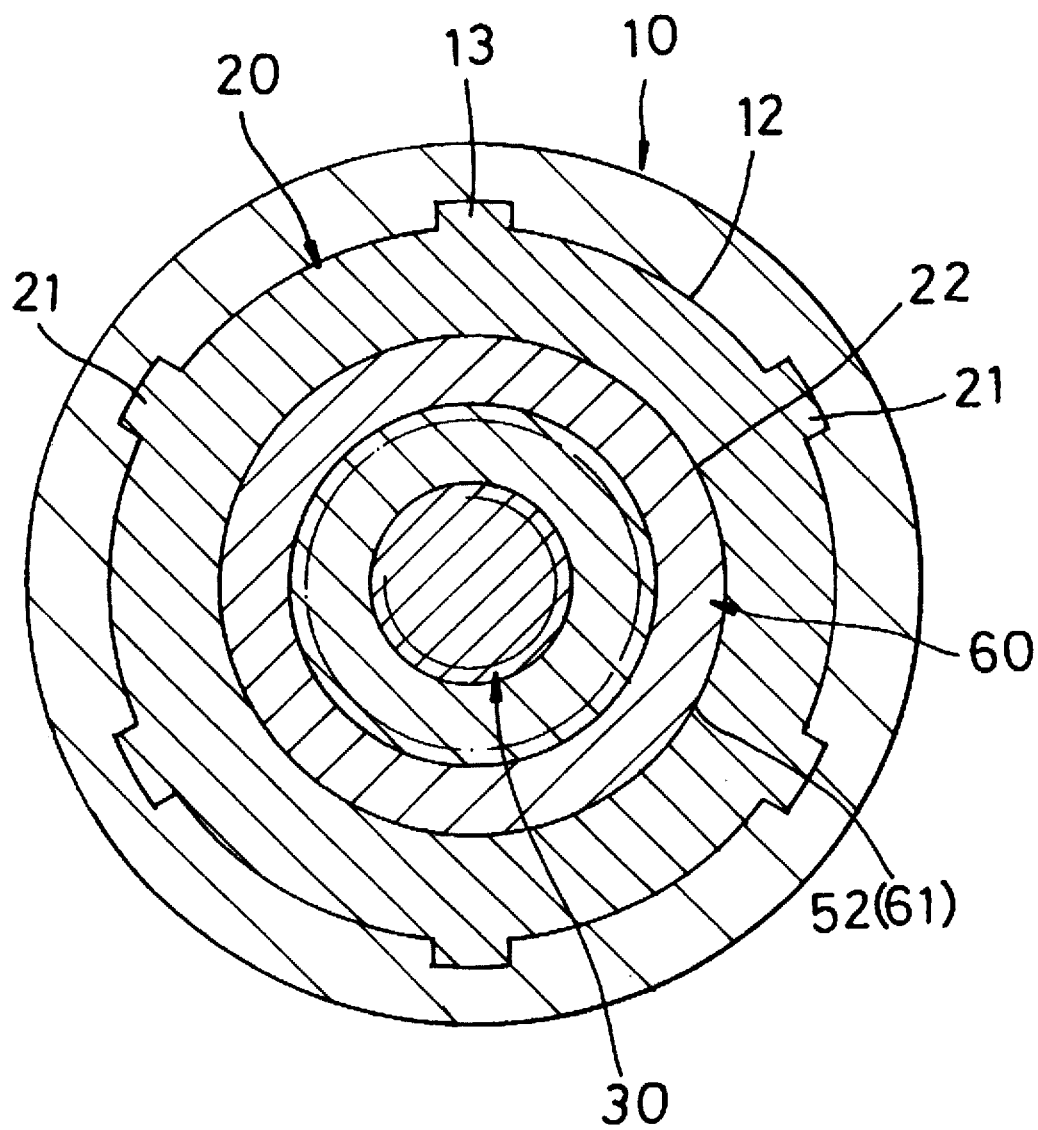
FIG. 3 is a sectional view taken along line I—I in FIG. 2.

Referring to FIGS. 2 and 3, the free-wheel hub transmission mechanism according to the present invention comprises a hub barrel 10, a reinforcing hollow body 20, an axle 30, a driving barrel 50, a coupling socket 60, a conical spring 70, a cup 80, and two lock nuts 90.

The axle 30 has an outer thread 31 around its periphery and is inserted through the driving barrel 50, the coupling socket 60, and the conical spring 70. Two lock nuts 90 are respectively fastened to two opposite end portions of the axle 30.

The hub barrel 10 is made of an aluminum alloy. The hub barrel 10 is rotatably mounted on the axle 30 and has a longitudinal through-hole 11 around the axle 30. In addition, the hub barrel 10 has an annular recess 12 and an annular shoulder 14 in its inner surface defining the through-hole 11. The diameter of the annular recess 12 is greater than that of the through-hole 11. The hub barrel 10 further has a plurality of first axial engagement surface members 13 which are angularly spaced in the annular recess 12. In this embodiment, the first axial engagement surface members 13 are grooves.

The driving barrel 50 is rotatably mounted on the axle 30 adjacent to the annular recess 12 for driving the hub barrel 10. The driving barrel 50 has a hollow threaded body portion 52 which extends into the through-hole 11 through the left end of the hub barrel 10, and a head portion 51 which extends outwardly of the hub barrel 10 for threading into the sprocket wheel 53. A ball bearing 40 is sleeved between the threaded body portion 52 and the head portion 51.

The reinforcing hollow body 20 is provided in the through-hole 11 around the axle 30 and coupled to one end of the hub barrel 10 for simultaneous rotation therewith. Specifically, the reinforcing hollow body 20 is received in the annular recess 12 and engages the annular shoulder 14 for locking itself against an axial movement. The reinforcing hollow body 20 further has second axial engagement surface members 21 angularly spaced to engage the first axial engagement surface members 13 against a rotational movement. In this embodiment, the second axial engagement surface members 21 are projecting blocks.

The coupling socket 60 is provided in the through-hole 11 around the axle 30. The front portion 63 of the coupling socket 60 extends into the reinforcing hollow body 20 and around the threaded body portion 52, and has an inner thread 61 which engages threadedly the threaded body portion 52. Therefore, the coupling socket 60 is movable toward and frictionally engageable with the reinforcing hollow body 20 upon rotation of the driving barrel 50 in one direction. The coupling socket 60 is disengageable from the reinforcing hollow body 20 upon rotation of the driving barrel 50 in another direction. The reinforcing hollow body 20 has a tapering bore 22 for receiving and engaging the front portion 63 of the coupling socket 60.

The conical spring 70 is mounted in the through-hole 11 around the axle 30 to bias the coupling socket 60 against the reinforcing hollow body 20. The cup 80 is mounted in the through-hole 11 around the axle 30 and secured in place by the respective lock nut 90 to stop the coupling socket 60 and the conical spring 70 from moving to the right.

As shown in FIGS. 2 and 3, the rear end of the threaded body portion 52 is threaded into the inner thread 61 of the coupling socket 60. The front portion 63 of the coupling socket 60 is inserted into the tapering bore 22. When the sprocket wheel 53 is rotated in one direction, the driving barrel 50 is synchronuously turned, causing the front portion 63 of the coupling socket 60 to move inward of the tapering bore 22 via the threading action of the threaded body portion 52 and the inner thread 61. As such, the driving barrel 50 is engaged with the coupling socket 60, and the coupling socket 60 gets into engagement with the reinforcing hollow body 20. As a result, the rotation of the driving barrel 50 is transmitted to the hub barrel 10.

Figure 4:
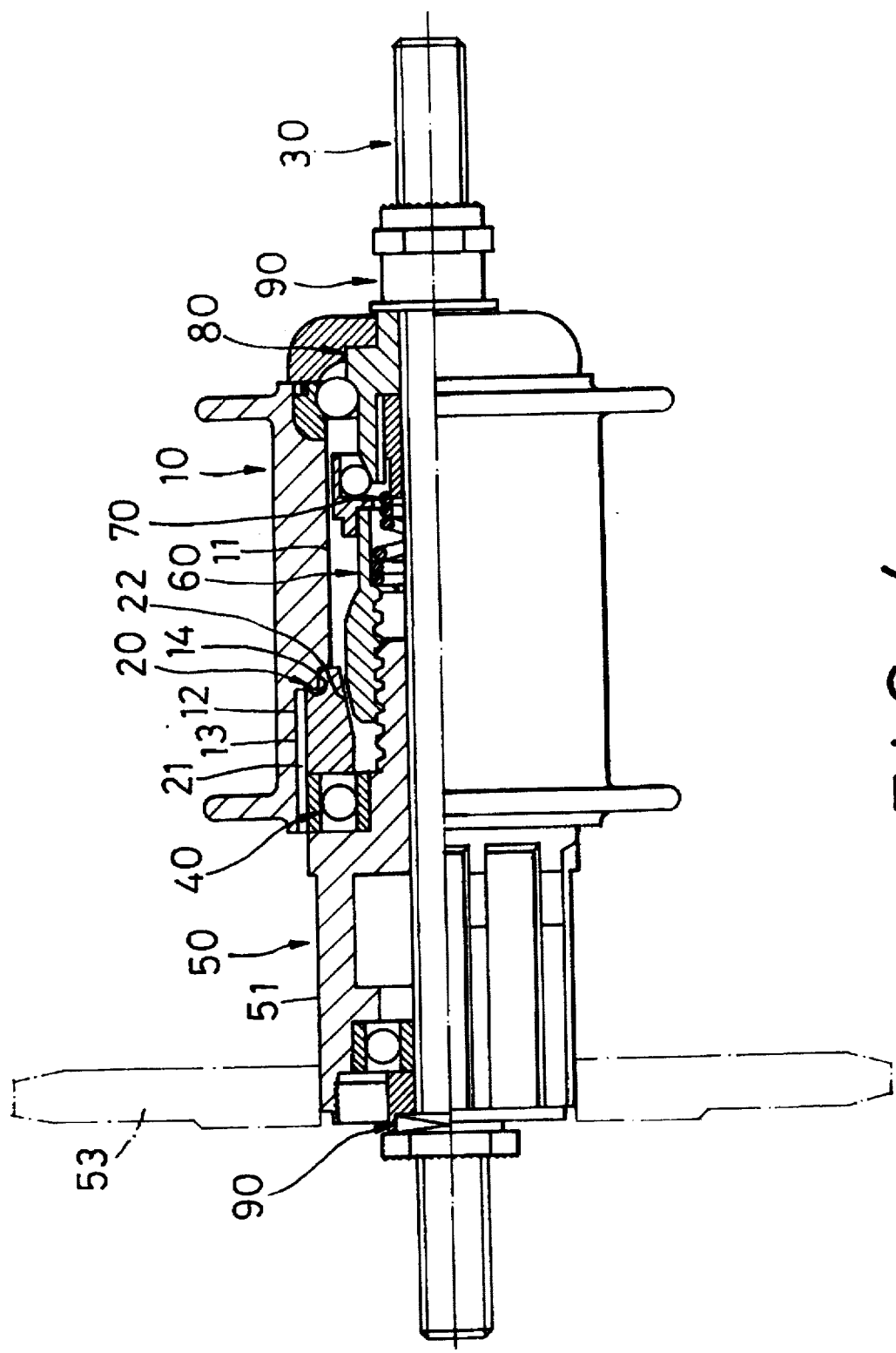
FIG. 4 is a sectional view of a free-wheel hub transmission mechanism according to this invention, in which the coupling socket disengages from the reinforcing hollow body.

Referring to FIG. 4, when the sprocket wheel 54 is rotated in the other direction, the driving barrel 50 is synchronuously turned, causing the front portion 63 of the coupling socket 60 to move to the right. Thus, the coupling socket 60 is disengaged from the tapering bore 22 of the reinforcing hollow body 20, thereby disconnecting the sprocket wheel 54 from the hub barrel 10 and causing the idle running of the sprocket wheel 53.

As mentioned above, the invention uses the reinforcing hollow body 20 to reinforce the connection between the hub barrel 10 and the coupling socket 60. Reinforcement is achieved in the invention while using a light weight hub barrel 10. Moreover, the tapering bore 22 of the reinforcing hollow body 20 provides a tight and firm engagement with the coupling socket 60.

While the present invention has been described in connection with what is considered the most practical and preferred embodiment, it is understood that this invention is not limited to the disclosed embodiments but is intended to cover various arrangement included within the spirit and scope of the broadest interpretations and equivalent arrangements.

I claim:

1. A free-wheel hub transmission mechanism comprising:

an axle;

an aluminum hub barrel rotatably mounted on said axle and having a longitudinal through-hole around said axle;

a driving barrel rotatably mounted on said axle for driving said hub barrel, said driving barrel having a threaded body portion extending into said through-hole, and a head portion extending outwardly of said hub barrel;

a sprocket wheel mounted to said head portion;

a reinforcing hollow body provided in said through-hole around said axle and coupled to said hub barrel for simultaneous rotation therewith;

a coupling socket provided in said through-hole around said axle, said coupling socket having a portion which extends into said reinforcing hollow body and around said threaded body portion and which engages threadedly said threaded body portion, said coupling socket being movable toward and frictionally engageable with said reinforcing hollow body upon rotation of said driving barrel in one direction, said coupling socket being disengageable from said reinforcing hollow body upon rotation of said driving barrel in another direction; and a spring mounted in said through-hole around said axle to bias said coupling socket against said reinforcing hollow body;

wherein said hub barrel has an inner surface defining said through-hole, and an annular recess and an annular shoulder formed on said inner surface, said reinforcing hollow body being received in said annular recess and engaging said annular shoulder for locking itself against an axial movement, said hub barrel further having first axial engagement surface members angularly spaced in said annular recess, said reinforcing hollow body further having second axial engagement surface members angularly spaced to engage said first axial engagement surface members against a rotational movement.

2. A free wheel hub transmission mechanism as claimed in claim 1, wherein said reinforcing hollow body has a tapering bore for receiving and engaging said portion of said coupling socket.

* * * * *